US012694549B2

(12) United States Patent (10) Patent No.: US 12,694,549 B2
Mittal et al. (45) Date of Patent: Jul. 28, 2026

(54) DEPTH ESTIMATION USING VARIANT FEATURES

(71) Applicant: Samsung Electronics Co., Ltd., Suwon-si (KR)

(72) Inventors: Akash Mittal, Champaign, IL (US); Brian Harms, San Jose, CA (US); Nigel Clarke, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 18/527,756

(22) Filed: Dec. 4, 2023

(65) Prior Publication Data

US 2025/0182309 A1 Jun. 5, 2025

(51) Int. Cl.
G06T 7/55 (2017.01)
G06T 7/73 (2017.01)

(52) U.S. Cl.
CPC ................. G06T 7/55 (2017.01); G06T 7/74 (2017.01); *G06T 2207/10016* (2013.01); *G06T 2207/30201* (2013.01)

(58) Field of Classification Search
CPC ... G06T 7/55; G06T 7/74; G06T 2207/10016; G06T 2207/30201; G06T 7/73
See application file for complete search history.

(56) References Cited

U.S. PATENT DOCUMENTS 8,091,842 B2 1/2012 Thomas
8,939,500 B2 1/2015 Voigt 9,044,172 B2 6/2015 Baxi
9,703,444 B2 7/2017 Nicholson
11,004,422 B1 5/2021 Bull
11,734,854 B2 8/2023 Huelsdunk
(Continued)

FOREIGN PATENT DOCUMENTS

CN 111815757 B 4/2023
CN 116091577 A 5/2023
(Continued)

OTHER PUBLICATIONS

"MediaPipe Iris: Real-time Iris Tracking & Depth Estimation," Posted by Andrey Vakunov and Dmitry Lagun, Research Engineers, Google Research (https://ai.googleblog.com/2020/08/mediapipe-iris-real-time-iris-tracking.html), Aug. 6, 2020.
(Continued)

*Primary Examiner* — Vu Le
*Assistant Examiner* — Rachel Anne Ometz

(57) ABSTRACT

In one embodiment, an apparatus includes accessing an image, captured by a first camera, of an object that includes a size-invariant feature and a size-variant feature and determining a size of the size-invariant feature in the image. The method further includes determining, based on the determined size of the size-invariant feature in the image, a distance between the camera and the object and determining a size of the size-variant feature in the image. The method further includes determining, based on the determined distance between the camera and the object and based on the determined size of the size-variant feature in the image, an actual size of the size-variant feature.

20 Claims, 3 Drawing Sheets

(56) References Cited

U.S. PATENT DOCUMENTS

| | | | | |
|---|---|---|---|---|
| 2015/0293588 | A1* | 10/2015 | Strupczewski | G06F 3/012 |
| | | | | 382/117 |
| 2017/0169570 | A1* | 6/2017 | Vashishtha | G06V 40/19 |
| 2018/0253143 | A1 | 9/2018 | Saleem | |
| 2020/0380901 | A1 | 12/2020 | Ryu | |
| 2022/0375126 | A1* | 11/2022 | Huelsdunk | G06T 7/77 |
| 2023/0103129 | A1* | 3/2023 | Morrell | G06T 7/55 |
| | | | | 382/206 |
| 2023/0116779 | A1* | 4/2023 | Hoyle | G06T 7/70 |
| | | | | 382/100 |
| 2023/0127218 | A1 | 4/2023 | Hsieh | |
| 2024/0031619 | A1 | 1/2024 | Jayaram | |

FOREIGN PATENT DOCUMENTS

| | | | | |
|---|---|---|---|---|
| CN | 116402870 | A | 7/2023 | |
| KR | 10-2020-0049958 | A | 5/2020 | |
| KR | 10-2022-0048109 | A | 4/2022 | |
| WO | WO-2022225115 | A1 * | 10/2022 | G07F 17/40 |

OTHER PUBLICATIONS

Shin et al., "Slow Robots for Unobtrusive Posture Correction" (CHI '19: ACM CHI Conference on Human Factors in Computing Systems), Apr. 2019.

Screen captures from YouTube video clip entitled "Roco—Robotic Computer Monitor" 4 pages, uploaded on Jan. 24, 2014 by user "gerbilproductions." Retrieved from internet: <https://www.youtube.com/watch?v=ljim-BW8Y8E&t=1s>.

Screen captures from YouTube video clip entitled "DOT Stand V1 (English Ver.)," 32 pages, uploaded on Aug. 7, 2022 by user "DOT Heal". Retrieved from internet: <https://www.youtube.com/watch?v=Xcs3YkJeCLQ>.

Kan, "This LG Monitor Can Continuously Move Itself to Meet Your Eye Level" PCMag (available at: https://www.pcmag.com/news/this-lg-monitor-can-continuously-move-itself-to-meet-your-eye-level), Aug. 2022.

Non-final office action in U.S. Appl. No. 18/527,899, Aug. 26, 2024.

Notice of Allowance in U.S. Appl. No. 18/527,899, Dec. 11, 2024.

International Search Report in Application No. PCT/KR2024/019677, Mar. 12, 2025.

Written Opinion of the International Searching Authority in Application No. PCT/KR2024/019677, Mar. 12, 2025.

P.J.A. Alphonse et al., Depth perception in single rgb camera system using lens aperture and object size: a geometrical approach for depth estimation, SN Appl. Sci. vol. 3, 595 (2021), May 1, 2021.

Yuan Cui et al., Camera distance helps 3D hand pose estimated from a single RGB image, ScienceDirect, Graphical Models, vol. 127, 101179, May 16, 2023.

* cited by examiner

DEPTH ESTIMATION USING VARIANT FEATURES

TECHNICAL FIELD

This application generally relates to depth estimation using variant features.

BACKGROUND

Estimating the distance of an object from a camera is required in many technological applications. For example, self-driving cars typically estimate the distance to an object using light detection and ranging (LiDAR) or using depth cameras that contain multiple RGB cameras, such as a stereo pair of cameras. However, such sensors are very expensive to deploy, and are impractical to use in consumer electronics. In addition, at least for embedded devices, these depth-estimation techniques are computationally expensive.

DESCRIPTION OF EXAMPLE EMBODIMENTS

The distance between an object and a camera capturing an image of the object can be estimated by approaches such as using LIDAR sensors or stereo cameras, but these sensors are very expensive to use and often require large amounts of computational resources to convert the sensed signal into a distance estimate. Likewise, estimation techniques based on deep learning methods to create a depth map using a single RGB camera are computationally expensive, making such methods difficult or impractical to usefully deploy on embedded devices.

Embodiments of this disclosure provide robust, accurate techniques to estimate the distance of an object from a camera that captures an image of the object. As explained more fully herein, the techniques described herein do not require any specialized sensors, but rather work with even a single RGB camera of the kind found on typical consumer electronics, such as a smartphone, web camera, or other commodity electronic device, and is computationally light enough to be used on embedded devices. The techniques described herein enable many applications in robotics, smartphone accessibility, face recognition-based authentication, etc., as described more fully herein.

Figure 1:
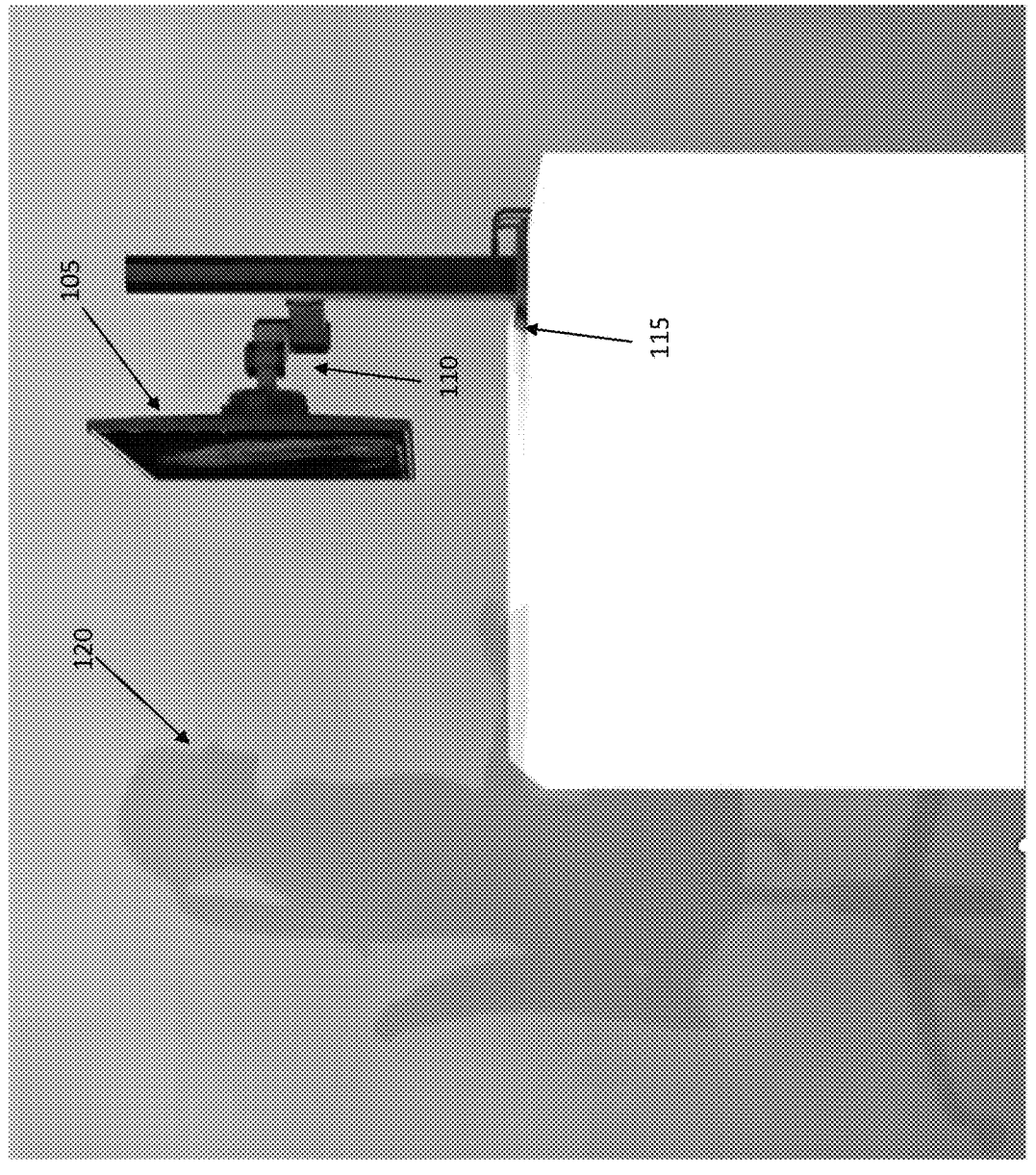
FIG. 1 illustrates an example in which the estimated distance between a camera and a person can be used to estimate the distance between the person's face and a display screen, such as a computer monitor.

An estimated distance between a first object and a camera capturing an image of the first object can be used to estimate the distance between the first object and another object, e.g., based on a known or estimated distance between the camera and the other object. For example, the estimated distance between a robotic end effector and a camera capturing an image of the robotic end effector can be used to estimate the distance between the end effector and another object. As another example, the estimated distance between a person and a camera can be used to estimate the distance between the person and another object. FIG. 1 illustrates an example in which the estimated distance between a camera and a person can be used to estimate the distance between the person's face and a display screen, such as a computer monitor. For instance, a camera 115 may be located in a base of the monitor and may take one or more images of the person's face 120. As explained below, using the techniques described herein, particular embodiments estimate the distance between the person's face 120 and camera 115. That distance estimate can then be used to estimate the distance between the person's face 120 and monitor display 105, for example using the known relative positions between camera 115 and monitor display 105. Based on the estimated distance between the person's face 120 and monitor display 105, the monitor may adjust the position of monitor display 105, for example using automated arm 110, which can include one or more robotic joints. Moving monitor display 105 can include adjusting the height of the display, the depth of the display, and/or a rotation of the display (e.g., an orientation of the display).

As explained more fully herein, in particular embodiments the estimated distance between a person and a display screen may be used to automatically adjust the display screen to an optimized position. While the example of FIG. 1 illustrates using an estimated distance between a camera and a person's face to modify the position of a monitor relative to a person's face, this disclosure contemplates that the distance estimation techniques described herein may be used for a wide variety of use cases.

In particular embodiments, a distance between two objects refers to a scalar (e.g., straight line) distance between those two objects. In particular embodiments, a distance between two objects refers to a vector distance, e.g., a difference in each of three dimensions (e.g., x, y, and z, in conventional Cartesian coordinates) describing the relative locations of two objects. In particular embodiments, depth estimates may come from techniques described herein, while relative positions in the plane of the image (e.g., in the x-y directions, if z is taken as the depth from a camera) may be used to determine values for the other two, non-depth dimensions.

Figure 2:
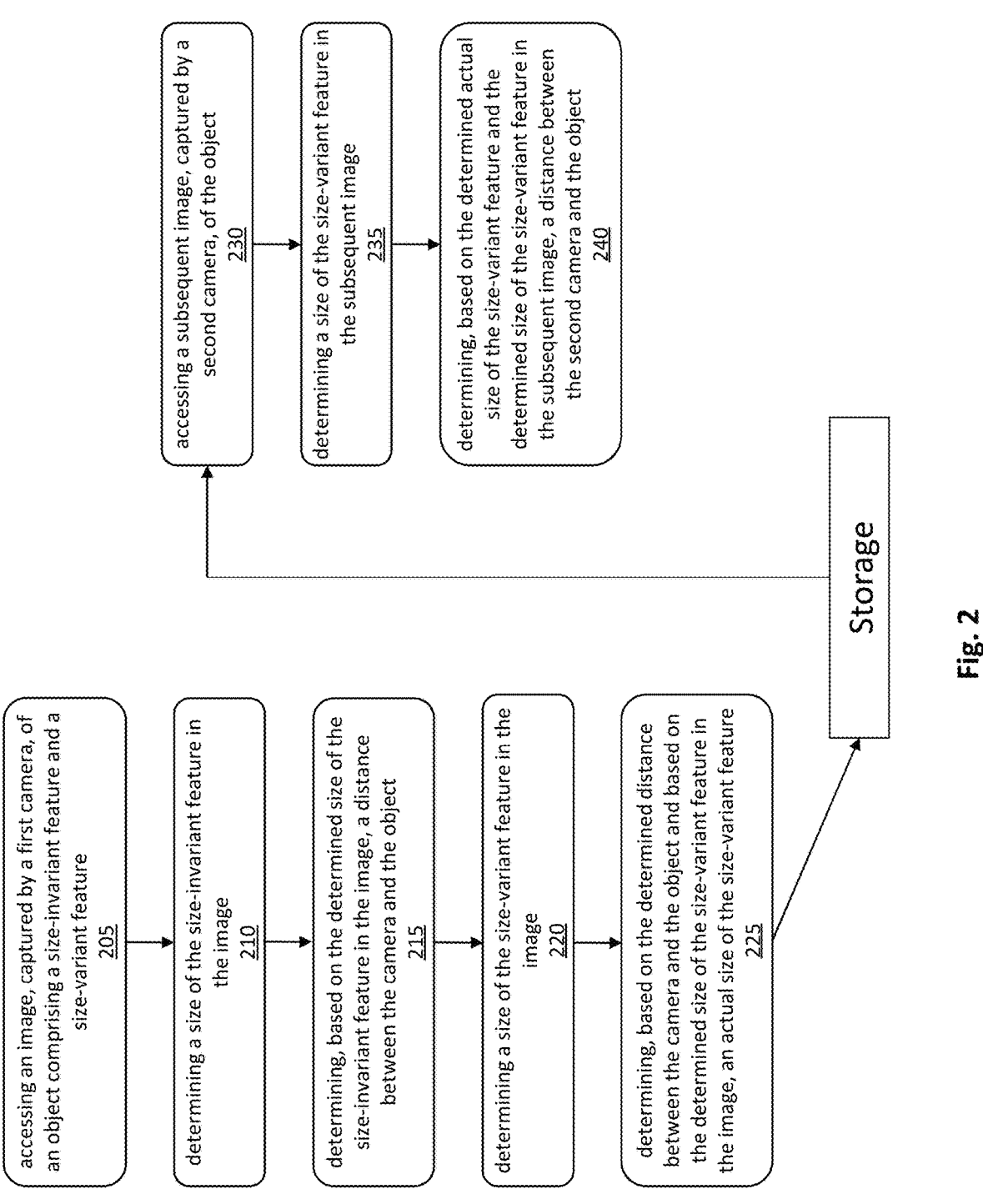
FIG. 2 illustrates an example method for estimating the distance between an object and a camera capturing the image of the object.

FIG. 2 illustrates an example method for estimating the distance between an object and a camera capturing the image of the object. Step 205 of the example method of FIG. 2 includes accessing an image, captured by a first camera, of an object that includes a size-invariant feature and a size-variant feature. The first camera may be an optical camera, such an RGB camera, or may sense a different part of the electromagnetic spectrum (e.g., an IR camera). Step 205 may be performed by a device that is integrated with the first camera or that is separate from the first camera. For example, step 205 may be performed by components of the example monitor shown in FIG. 1, which includes a camera 115. In particular embodiments, step 205 may be performed by a personal computer, a smartphone, a tablet, a server device, etc., which may access the image from a storage associated with the first camera or may access the image from an intermediary device (e.g., a client or server computing device) storing the image from the first camera.

As used herein, a feature refers to some information about the content of an image; typically, about whether a certain region of the image has certain properties. Features may be specific structures in the image such as (but not limited to) points, edges, and/or objects, or combinations thereof. Variant features are features that vary among objects of a similar kind. For example, IPD (Inter-Pupillary Distance), distance between an eye and an ear, or the size of a person's nose varies among humans. In contrast, invariant features are features that that don't change across at least some objects of same kind. For example, a company's branding on a product (e.g., a company's logo) often has the same size across different models of a product (e.g., across TVs of different sizes). As another example, the iris diameter is essentially same (i.e., about 11.7 mm across) for all humans.

Step 210 of the example method of FIG. 1 includes determining a size of the size-invariant feature in the image. In particular embodiments, step 210 includes identifying a size-invariant feature in the image, e.g., using object recognition techniques. In particular embodiments, the image accessed in step 205 may be a portion of the image that contains the size-variant feature, e.g., feature extraction may have already occurred.

In particular embodiments, before identifying the size of a size-invariant feature, step 210 may include determining whether a size-invariant feature in the image satisfies one or more visibility criteria. For example, a visibility criterion may be whether, or to what extent, a size invariant feature is occluded in the image. For example, a visibility criterion may be that the size invariant feature cannot be occluded, or cannot be occluded by more than a certain threshold. As another example, a visibility criterion may require that the size-invariant feature covers more area in the image than a predefined threshold. The area may be expressed in, e.g., the number of pixels covered by the size-invariant feature. In particular embodiments, a predefined threshold may be determined empirically and may depend on the actual size of the feature. For example, a relatively smaller feature may have a smaller threshold than would a relatively larger feature. As another example, a visibility criterion may be how parallel the object is to the plane of the image. For example, a visibility criterion may require that a size-invariant feature be less than a certain angle relative to the plane of the image. In particular embodiments, multiple visibility criteria may be used, and the criteria may be weighted in order to determine whether a feature is deemed sufficiently visible.

If a size invariant feature is not visible, then in particular embodiments, additional images of the size-invariant feature may be accessed. For instance, in the example of FIG. 1, camera 115 may be capturing images at a certain rate (e.g., 30 frames per second), and step 205 may continue until a size-invariant feature is deemed sufficiently visible to perform step 210. In particular embodiments, if a size-invariant feature is not visible, then a device may submit one or more instructions to a user to move an object in a manner that improves visibility. For instance, in the example of FIG. 1, if the person's face 120 is occluded, then a message may be presented on display 105 instructing the user to turn their head, move closer to camera 115, remove occluding objects such as sunglasses, etc.

Step 215 of the example method of FIG. 2 includes determining, based on the determined size of the size-invariant feature in the image, a distance between the camera and the object. In particular embodiments, in step 215 a projection matrix may be used to determine the size of a size-invariant feature in an image. Step 210 may include determining the size D of a size-invariant feature in an image according to:

$$D = \frac{IFS \times \cos(\text{object}_{rotation}) \times F}{IFS_{Image}} \quad (1)$$

where IFS is the invariant features size (e.g., in meters); F is the focal length of the camera (which may be fixed for the camera and defined in the camera specifications); $IFS_{Image}$ is the invariant feature size in the image, in pixels; D is the distance of the object; and $\text{object}_{rotation}$ is the relative rotation of the object relative to center. For example, $\text{object}_{rotation}$ may represent the relative rotation of a person's head from center (i.e., looking directly at the camera), and may be used to take the projected distance to compensate for head rotation. In particular embodiments, the object (e.g., head) rotation may be determined based on output from a deep-learning-based computer vision model.

Step 220 of the example method of FIG. 2 includes determining a size of the size-variant feature in the image. For example, a variant feature may be extracted from the image (e.g., using object recognition techniques), and this extraction may occur as part of, or separately from and prior to, step 220. In particular embodiments, a visibility determination may be made for an identified variant feature, so that a size of a variant feature is identified only when the variant feature is sufficiently visible in the image. Examples of visibility criteria that may be applied to size-variant features include the examples of visibility criteria described for size-invariant features, above.

In step 220, the size of a size-variant feature in an image may be determined in pixels. Then, step 225 of the example method of FIG. 2 includes determining, based on the determined distance between the camera and the object and based on the determined size of the size-variant feature in the image, an actual size of the size-variant feature. For example, the actual variant-feature size (VFS) of a size-variant feature may be determined according to:

$$VFS = \frac{VFS_{Image} \times D}{F \times \cos(\text{object}_{rotation})} \quad (2)$$

where D, F, and $\text{object}_{rotation}$ are as described above in connection with equation 1; and $VFS_{Image}$ is the variant feature size (in pixels) of the variant feature in the image.

In particular embodiments, steps 220-225 may be performed for each of multiple size-variant features identified in an image of an object. In particular embodiments, the size of each size variant feature determined in step 225 may be stored, e.g., in a memory of a computing device. In particular embodiments, this storage may be temporary, for example so that the size information can be immediately used in steps 230-240. For instance, in the example of FIG. 1, the system may determine that a person has entered the view of camera 115, e.g., using face-recognition techniques. The method of FIG. 2 may be performed for that person (with steps 230-240 performed periodically, as described below) and then repeated when the person leaves the camera's field of view. For example, a size variant feature of the person's face may be determined and stored until the person leaves the camera view, and when another person enters the field of view, then the method of FIG. 2 may repeat.

In particular embodiments, the size of each size variant feature may be stored along with an identification of the object, so that the variant-features sizes may be subsequently accessed and used in steps 230-240 for that object. In particular embodiments, there may be a temporal gap between the performance of steps 205-225 and the performance of steps 230-240. For instance, a person's size-variant features and sizes may be stored, along with an identification of the person (e.g., using the person's biometrics such as face, fingerprint, etc.; or using other identifying information such as a passcode, etc.). Then, the person may subsequently be identified (using any suitable stored identification information) and the person's size-variant features may be accessed in connection with steps 230-240.

In particular embodiments, once the actual size of a first size-variant feature is identified in step 225, then the actual size of second size-variant features may be determined using the actual size and image size of the first size-variant feature.

In particular embodiments, the size of each size variant feature may be stored by a particular device, e.g., by a monitor device as illustrated in the example of FIG. 1. In particular embodiments, the size of each size variant feature may be stored for use with multiple devices, and/or may be stored in association with a particular user account. For example, once a particular person's size variant features and size are identified, then that information may be used for multiple different devices. For instance, that person's monitors at home and at work, as well as the person's TVs, smartphones, personal computers, and other devices (e.g., rear-view mirror in car, etc.) may all use that person's size-variant features in connection with steps 230-240 for that device.

In particular embodiments, some or all of steps 205-225 of the example method of FIG. 2 may be performed more than once for a particular object. For example, a user's workplace monitor may associate the person with a set of size-variant features and corresponding sizes. Later, the user's workplace monitor (or another device, e.g., a smartphone) may execute the method of FIG. 2 and identify other size-variant features with sufficient visibility, and these other size variant features may be added to the user's stored set of size-variant features.

Step 230 of the example method of FIG. 2 includes accessing a subsequent image, captured by a second camera, of the object. In particular embodiments, the first camera and the second camera may be the same camera. As described above, the image in step 205 and the subsequent image in step 230 may be captured as part of a single process, e.g., steps 205-225 and step 230-240 may be performed as a single process. In particular embodiments, the image in step 205 and the subsequent image in step 230 may be captured as part of distinct processes, which may separate in time and in space (e.g., the first camera may be at a first location and/or part of a first device and the second camera may be at a different location and/or is part of a different device).

Step 235 of the example method of FIG. 2 includes determining a size of the size-variant feature in the subsequent image. The size of the size-variant feature in the subsequent image may be represented in pixels. In particular embodiments, step 235 may include identifying and extracting size-variant features in the subsequent image, or this identification and extraction may have already occurred (e.g., step 230 may include accessing the extracted portion(s) of the subsequent image corresponding the size-variant feature(s)). In particular embodiments, specific size-variant features may be identified in association with an identification of the object (e.g., with an identification of a specific person). In particular embodiments, the identification of the size-variant features may be made from the set of size-variant features identified in step 225, e.g., as stored temporarily or permanently in a memory of device.

In particular embodiments, step 235 of the example method of FIG. 2 may include selecting a specific size-variant feature or features to use to estimate a distance. In particular embodiment, this selection may be based on one or more visibility criteria, for example the visibility criteria described above. For example, if multiple size-variant features are present in an image, then the size-variant feature with the highest visibility may be selected to use in subsequent steps. As explained herein, this selection may be done on a frame-by-frame basis, so that as the object moves over time, features may be more or less visible, and the best feature or features are selected at any particular moment.

While step 235 of the example method of FIG. 2 involves selecting a size-variant feature and determining the size of that feature, this disclosure contemplates that, in particular embodiments, size-variant and size-invariant features may be pooled together for selection, e.g., so that the most visible feature (whether size variant or size invariant) may be selected.

Step 240 of the example method of FIG. 2 includes determining, based on the determined actual size of the size-variant feature and the determined size of the size-variant feature in the subsequent image, a distance between the second camera and the object. In particular embodiments, the distance D of an object and the second camera may be determined according to:

$$D = \text{Average} \left( \frac{(VFS \times F \times \cos(\text{object}_{rotation}))}{VFS_{Image}} \right) \quad (3)$$

where the variables are as described above. As illustrated in the example of equation 3, in particular embodiments, a smoothing process such as an averaging may be applied to the calculated values to determine the distance D. For example, the data may be averaged over a certain number of frames or a certain amount of time, in order to provide more reliable distance estimates, and/or in order to avoid frequently changing distance estimates (and therefore potentially too frequently adjusting an object's distance).

The distance estimated in step 240 may be used for any suitable procedure that requires a distance determination between an object and a camera or between two objects, one of which has a known distance relative to the camera. For instance, in the example of FIG. 1, the distance estimated in step 240 between the person's face and the monitor display may be used to automatically adjust the position of the monitor display. This adjustment may be made based on, e.g., one or more user preferences specifying the distance between the user and the monitor (e.g., the straight-line distance, the height of the monitor relative to the user's face, etc.) and/or specifying the orientation of the device. In particular embodiments, an adjustment may be based on predetermined values (e.g., values based on optimal viewing distances and/or user posture). In particular embodiments, a distance estimate may be used in connection with other information, such as content displayed on a display, to adjust the position (e.g., orientation) of the display.

Steps 230-240 may be periodically repeated over time to provide updated distance estimates over time (using updated variant feature selections, if the most visible variant feature changes over time). For instance, in the example of FIG. 1, steps 230-240 may be periodically repeated in order to update the position of the monitor relative to the user's face throughout the user's interaction with the monitor. In particular embodiments, steps 230-240 may repeat substantially continuously, e.g., throughout a user's use of the device. In particular embodiments, steps 230-240 may repeat periodically, e.g., every N frames or every X seconds. In particular embodiments, steps 230-240 may repeat at an interval that depends on, e.g., user preferences and/or the availability of computational resources to perform the method.

In particular embodiments, an adjustment of a device based on a distance estimate may occur each time the distance estimate is updated and would result in an updated movement (e.g., due to user preferences). In particular embodiments, adjustment updates may be subject to a sensitivity parameter, which specifies a threshold beyond which to adjust the position of the device. For example, a threshold may be based on adjustment amount (e.g., a relatively minor adjustment is ignored) and/or a time since the last adjustment (e.g., an adjustment that would be too near to a previous adjustment is ignored), for example to avoid frequent, minor movement of a device, which may decrease the quality of a user's experience. In particular embodiments, an adjustment sensitivity may be based on user preferences. In particular embodiments, a sensitivity adjustment may depend on information regarding the user or the device. For example, an adjustment may be ignored if the user is not looking at the device (e.g., as determined by eye tracking); i.e., the adjustment algorithm for a device may be disabled while the user is not looking at the device.

As explained above, techniques described herein can estimate the distance of an object from a camera based on only a single image (e.g., a single RGB image). This estimate can be used to determine the size of several size-variant features that ordinarily could not be used to estimate distance, but in the techniques described herein, can be used to estimate distance. Moreover, techniques described herein obviate the need to always use size-invariant features to estimate distance, as given the typically small size of invariant features, even a slight error (e.g., 1-2 pixels off) in measurement can lead to large error in estimating distance. Instead, distance estimates can be performed using a variety of size-variant features and then selecting the best (most visible) feature, in particular embodiments. Moreover, techniques described herein do not require asking a user to place a camera at a fixed, predefined distance from an object in order to calibrate a distance-estimation algorithm, which is subject to significant user error.

In particular embodiments, a distance estimate may be used to dynamically size one or more elements, such as user interface (UI) elements, displayed on a display. For example, a UI element may be relatively larger if a user is detected to be relatively further from the display. As another example, eye tracking (e.g., eye gaze) detection may be enabled using a distance estimate. For example, the distance estimate and may be used to determine a user's iris offset relative to a display, and this information along with, e.g., head rotation or gaze direction, may be used to determine a focus point on a display.

In particular embodiments, a person's specific variant features (e.g., variant facial features) may be used to authenticate or identify the person, based on matching the size of the person's features to the previously determined sizes for that person. In particular embodiments, distance information may be used as depth information to generate a three-dimensional representation of scene captured by an image. For example, invariant features such as logos on products, coins, cans, bottles, etc. may be used to determine distance information between an object and a camera.

Particular embodiments may repeat one or more steps of the method of FIG. 2 as appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2. Moreover, this disclosure contemplates that certain steps of the example method illustrated in FIG. 2, may be performed by circuitry of a computing device described herein, by a processor coupled to non-transitory computer readable storage media, or any suitable combination thereof.

Figure 3:
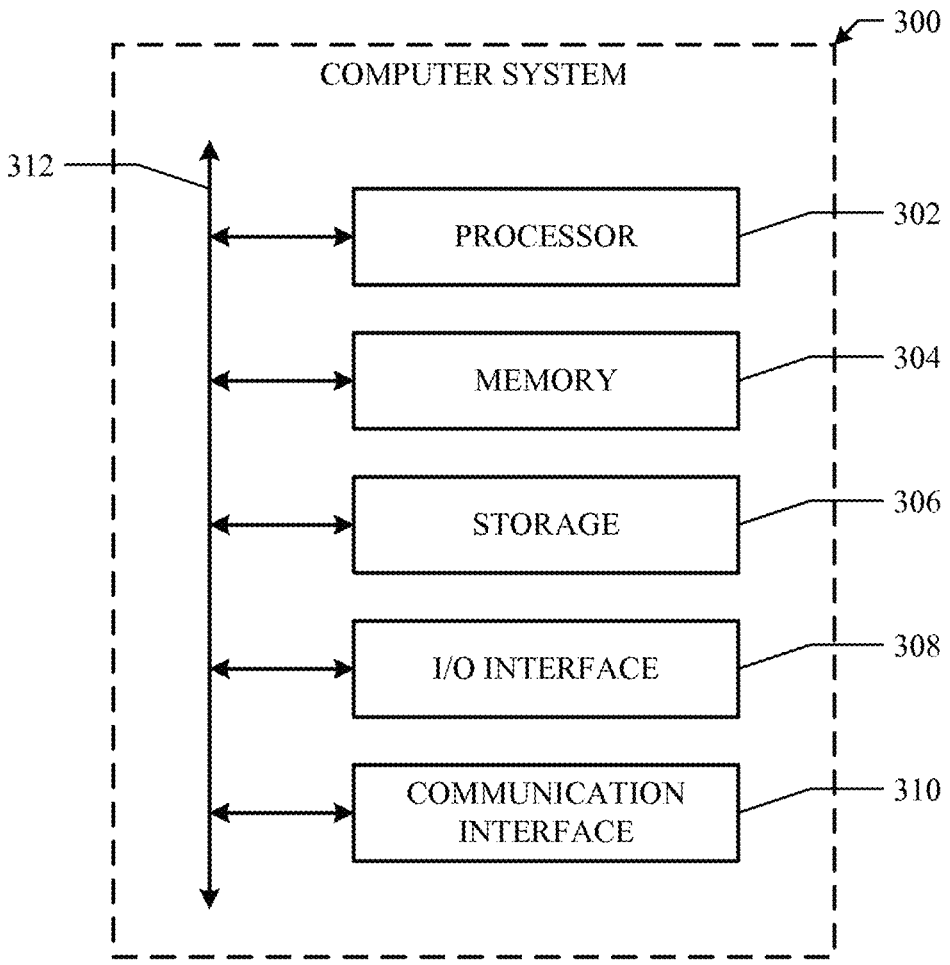
FIG. 3 illustrates an example computing system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage

306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

accessing an initial image, captured by a first camera, of an object comprising a size-invariant feature and a size-variant feature;

determining a size of the size-invariant feature in the initial image;

determining, based on the determined size of the size-invariant feature in the initial image, a distance between the camera and the object;

determining a size of the size-variant feature in the initial image;

determining, based on the determined distance between the camera and the object and based on the determined size of the size-variant feature in the initial image, an actual size of the size-variant feature;

accessing a subsequent image, captured by a second camera, of at least the size-variant feature;

determining a size of the size-variant feature in the subsequent image; and determining, based on the determined actual size of the size-variant feature and the determined size of the size-variant feature in the subsequent image, a distance between the second camera and an object comprising the size-variant feature.

2. The method of claim 1, further comprising:

determining that an appearance of the size-invariant feature in the initial image satisfies one or more visibility criteria; and determining the size of the size-invariant feature in the initial image in response to the determination that the size-invariant feature in the initial image satisfies the one or more visibility criteria.

3. The method of claim 1, wherein the accessed initial image is a first one of a plurality of accessed initial images of the object, the method further comprising:

determining, for each of the plurality of accessed initial images, a visibility of the size-invariant feature in that image;

selecting, based on the determined visibility of the size-invariant feature in each of the plurality of accessed initial images, a particular initial image as the first one of the plurality initial images.

4. The method of claim 1, wherein the object comprising the size-variant feature in the subsequent image is the same object comprising the size-invariant feature and the size-variant feature in the initial image.

5. The method of claim 1, wherein the first camera is the same as the second camera.

6. The method of claim 4, wherein the size-variant feature is a first size-variant feature of a plurality of size-variant features of the object, the method further comprising:

determining, for each of the plurality of size-variant features, a visibility of the size-variant feature in the subsequent image; and selecting, based on the determined visibility of the size-variant features, a particular size-variant feature as the first size-variant feature.

7. The method of claim 6, wherein the determined visibility is based on one or more of:

an occlusion of the respective size-variant feature;

a coverage area of the respective size-variant feature relative to a coverage threshold;

an angle between a plane of the subsequent image and the respective size-variant feature; or a rotation of the object.

8. The method of claim 4, further comprising determining, based on the determined distance between the second camera and the object, a distance between the object and a device.

9. The method of claim 8, further comprising automatically adjusting a position of the device based on the determined distance between the object and the device.

10. The method of claim 9, wherein the object comprises a person's face, and the device comprises a display screen.

11. The method of claim 10, further comprising automatically adjusting the position of the display screen based on one or more preferences of the person.

12. The method of claim 10, wherein the display screen is part of a computer monitor.

13. The method of claim 10, further comprising:

identifying the person; and associating the actual size of the size-variant feature with the identity of the person.

14. An apparatus comprising one or more non-transitory computer readable storage media storing instructions; and one or more processors coupled to the non-transitory computer readable storage media, the one or more processors operable to execute the instructions to:

access an initial image, captured by a first camera, of an object comprising a size-invariant feature and a size-variant feature;

determine a size of the size-invariant feature in the initial image;

determine, based on the determined size of the size-invariant feature, a distance between the camera and the object;

determine a size of the size-variant feature in the initial image;

determine, based on the determined distance between the camera and the object and based on the determined size of the size-variant feature, an actual size of the size-variant feature access a subsequent image, captured by a second camera, of at least the size-variant feature;

determine a size of the size-variant feature in the subsequent image; and determine, based on the determined actual size of the size-variant feature and the determined size of the size-variant feature in the subsequent image, a distance between the second camera and an object comprising the size-variant feature.

15. The apparatus of claim 14, wherein the object comprising the size-variant feature in the subsequent image is the same object comprising the size-invariant feature and the size-variant feature in the initial image.

16. A method comprising:

accessing a subsequent image, captured by a second camera, of an object comprising a size-variant feature;

determining a size of the size-variant feature in the subsequent image;

accessing an actual size of the size-variant feature, wherein the actual size of the size-variant feature is based on:

a determined size of the size-invariant feature in an initial image, captured by a first camera, of an object comprising a size-invariant feature and the size-variant feature;

a distance, determined based on the determined size of the size of the size-invariant feature in the initial image captured by the first camera, between the first camera and the object in the initial image; and a size of the size-variant feature in the initial image captured by the first camera; and determining, based on the actual size of the size-variant feature and the determined size of the size-variant feature in the subsequent image, a distance between the second camera and the object comprising the size-variant feature.

17. The method of claim 16, wherein the object comprising the size-variant feature in the subsequent image is the same object comprising the size-invariant feature and the size-variant feature in the initial image.

18. The method of claim 16, further comprising determining, based on the determined distance between the second camera and the object, a distance between the object and a device.

19. The method of claim 18, further comprising automatically adjusting a position of the device based on the determined distance between the object and the device.

20. The method of claim 19, wherein the object comprises a person's face, and the device comprises a display screen.

\* \* \* \* \*